United States Patent [19]

Mathias et al.

[11] Patent Number: 4,888,992
[45] Date of Patent: Dec. 26, 1989

[54] ABSOLUTE PRESSURE TRANSDUCER AND METHOD FOR MAKING SAME

[75] Inventors: Milton W. Mathias, Colorado Springs, Colo.; Douglas W. Wilda, Ambler, Pa.

[73] Assignee: Honeywell Inc., Minneapolis, Minn.

[21] Appl. No.: 378,468

[22] Filed: Jul. 12, 1989

Related U.S. Application Data

[63] Continuation of Ser. No. 181,769, Apr. 15, 1988, abandoned.

[51] Int. Cl.⁴ .............................................. G01L 9/04
[52] U.S. Cl. .................................... 73/727; 29/621.1; 73/721; 338/4
[58] Field of Search .................. 73/715, 720, 721, 726, 73/727, DIG. 4; 338/4; 361/283; 33/DIG. 13; 29/621.1

[56] References Cited

U.S. PATENT DOCUMENTS

| | | | |
|---|---|---|---|
| 3,406,572 | 10/1968 | Robillard | 73/727 |
| 3,817,107 | 6/1974 | Shimada et al. | 73/727 |
| 4,023,562 | 5/1977 | Hynececk et al. | 73/727 |
| 4,217,783 | 8/1980 | Ito et al. | 73/726 |
| 4,295,116 | 10/1981 | Studlien | 29/621.1 |
| 4,303,903 | 12/1981 | Matsuoka et al. | 338/4 |
| 4,452,202 | 6/1984 | Meyer | 73/723 |
| 4,488,436 | 12/1984 | Mohri et al. | 73/726 |
| 4,499,774 | 2/1985 | Tsuchiya et al. | 73/727 |
| 4,502,335 | 3/1985 | Wamstad et al. | 73/721 |
| 4,586,018 | 4/1986 | Bettman | 73/720 |
| 4,610,256 | 9/1986 | Wallace | 73/740 |
| 4,703,658 | 11/1987 | Mrozack, Jr. et al. | 361/283 |
| 4,841,777 | 6/1989 | Hershey et al. | 338/4 |

FOREIGN PATENT DOCUMENTS 2031592 4/1980 United Kingdom .................. 73/721

Primary Examiner—Joseph A. Orsino
Assistant Examiner—Brent A. Swarthout
Attorney, Agent, or Firm—Mitchell J. Halista; Albin Medved

[57] ABSTRACT

An absolute pressure transducer includes a hollow glass tube supporting across one end thereof a differential pressure responsive semiconductor plate having piezoresistive elements diffused therein and an evacuated sealed chamber within the tube exposed to the plate. A method for making the transducer and providing the evacuated chamber within the tube adjacent to the plate includes the steps of mounting the plate across the end of the tube to form a first fluid-tight seal therewith, inserting a loose glass plug within the tube to define the chamber, exposing the interior of the tube to a vacuum, concurrently heating the tube in the vicinity of the plug to allow the heated tube wall to constrict around the plug in response to the internal vacuum and to fuse with the plug to form a second fluid-tight seal therewith and allowing the tube and plug to cool to trap the vacuum in the chamber. A pressure transmitter uses the transducer with electrical connections to the piezoresistive elements in a fluid filled system for applying an external pressure to the plate to produce an output signal from the elements representative of the differential pressure between the evacuated chamber and the external pressure.

15 Claims, 2 Drawing Sheets

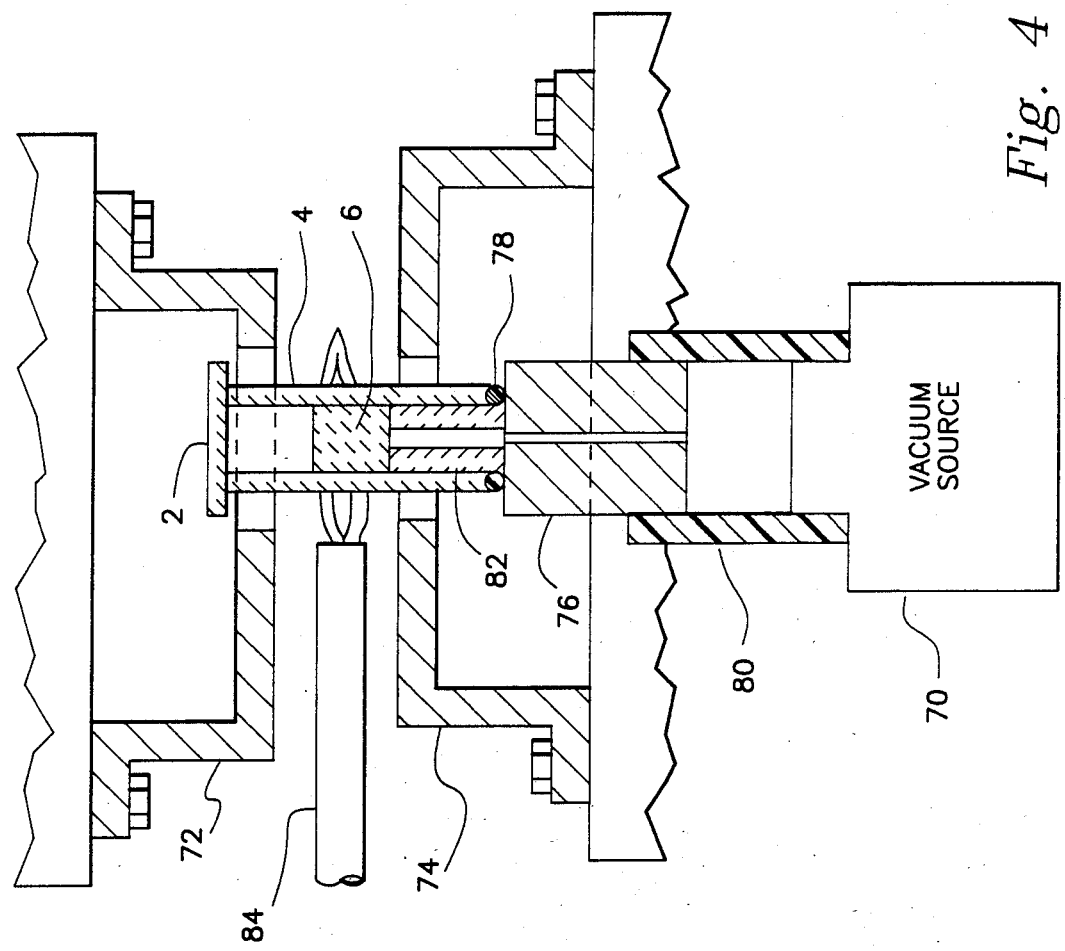
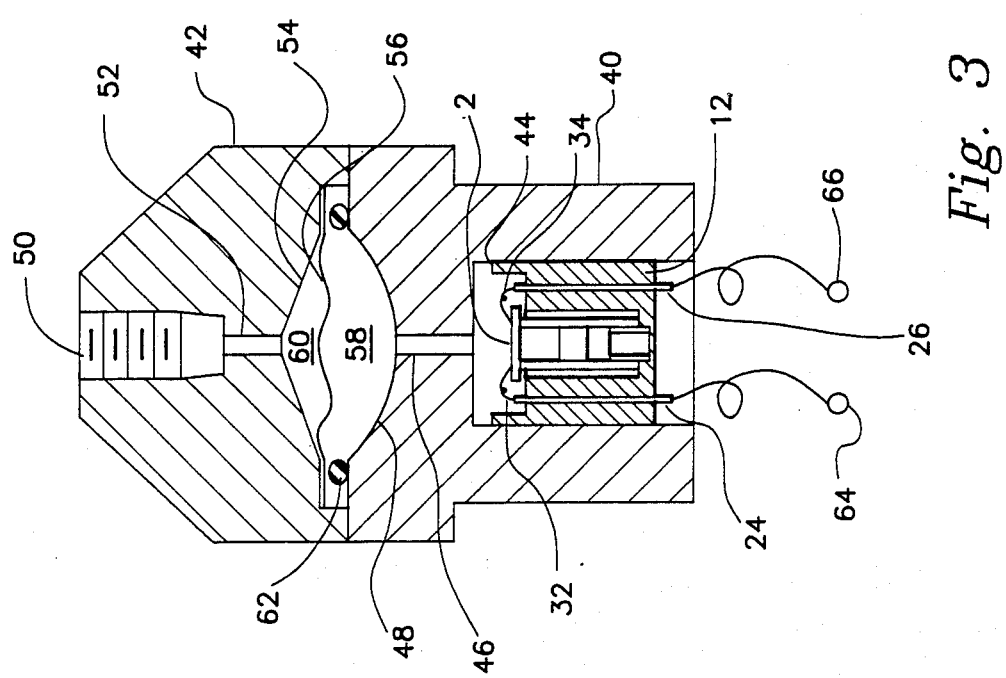

ABSOLUTE PRESSURE TRANSDUCER AND METHOD FOR MAKING SAME

This application is a continuation of application Ser. No. 181,769 filed Apr. 15, 1988, now abandoned.

BACKGROUND OF THE INVENTION

1. Field of the Invention

The present invention relates to absolute pressure transducers. More specifically, the present invention is directed to a method for making an absolute pressure transducer and a transducer made thereby.

2. Description of the Prior Art

Pressure sensors or transducers using a plate or diaphragm of semiconductor material and having diffused strain-sensitive elements therein are well-known in the art, as shown in U.S. Pat. Nos. 4,023,562 and 4,295,115. Further, absolute pressure transducers using a semiconductor plate or diaphragm exposed to an evacuated chamber are also well-known in the art as shown in the aforesaid patents and as additionally shown in U.S. Pat. Nos. 4,287,501 and 4,703,658. However, as taught by the these prior art references, the known absolute pressure transducers involve manufacturing methods and structures which are inherently complicated and which add significantly to the manufacturing cost of the transducers. Accordingly, it is desirable to provide an absolute pressure transducer having a greatly simplified method of manufacture to produce a simple transducer structure and a significantly lowered manufacturing cost.

SUMMARY OF THE INVENTION

An object of the present invention is to provide an improved method for manufacturing an absolute pressure transducer.

Another object of the present invention is to provide an improved absolute pressure transducer.

A further object of the present invention is to provide an improved pressure transmitter using the improved pressure transducer.

In accomplishing these and other objects, there has been provided, in accordance with the present invention, a method for making an absolute pressure transducer including the steps of mounting a strain responsive plate having strain-sensitive elements supported thereon across on end of an electrically insulating tube to form a first fluid-tight seal therewith, inserting a loose plug of a material similar to the material of the tube within the tube to define a chamber exposed to the plate, exposing the interior of the tube to a vacuum, concurrently heating the tube in the vicinity of the plug to allow the heated tube wall to fuse with the plug to form a second fluid-tight seal therewith and allowing the tube and plug to cool to trap the vacuum in the chamber. A pressure transmitter uses the transducer with electrical connections to the strain-sensitive elements in a fluid filled system for applying a external pressure to the plate to produce an output signal from the strain-sensitive elements representative of the differential pressure between the evacuated chamber and the external pressure.

BRIEF DESCRIPTION OF THE DRAWING

A better understanding of the present invention may be had when the following detailed description is read in connection with the accompanying drawings in which:

FIG. 3 is a cross-sectional illustration of a pressure transducer using the transducer support and transducer shown in FIG. 2 and FIG. 4 is a pictorial illustration of the apparatus used to make the transducer shown in FIG. 1.

DESCRIPTION OF THE PREFERRED EMBODIMENT

Figure 1:
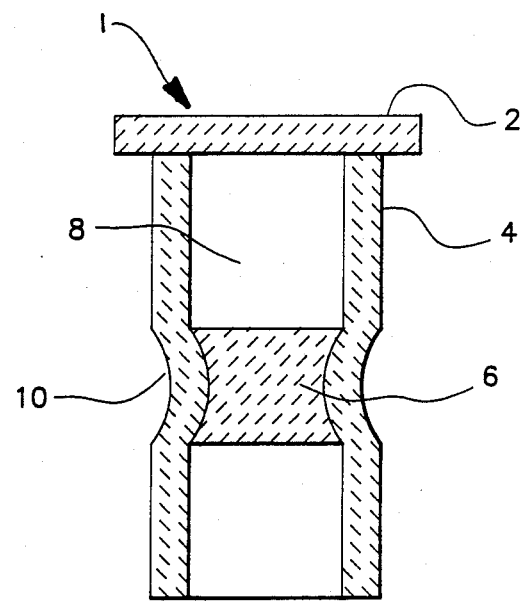
FIG. 1 is a cross-sectional illustration of a completed absolute pressure transducer utilizing the method of the present invention.

Referring to FIG. 1, there is shown an absolute pressure transducer 1 using a semiconductor plate or diaphragm 2 having strain-sensitive elements, e.g., piezoresistive diffused therein. The plate 2 is mounted across an open end of an electrically insulating tube 4, e.g., Pyrex, by conventional means. For example, the plate 2 may be attached by first metallizing the end of the tube 4, e.g., using a titanium-tungsten and gold layering process, and subsequently providing a thermal-electron bond of the plate to the metallized surface. The plate 2 is wider than the outer diameter of the tube 4 and the aforesaid mounting provides a first fluid-tight seal across the tube 4. A plug 6 is located within the bore of the tube 4 to define a chamber 8 within the tube 4 adjacent to the plate 2. The tube 4 has a constricted wall 10 in the vicinity of the plug 6 as a result of the assembly of the transducer 1 as discussed hereinafter. The constricted portion 10 of the wall 4 is bonded or fused to the plug 6 to form a second fluid-tight seal therewith to define a chamber 8 exposed to the plate 2. The chamber 8 is arranged to be an evacuated chamber to provide a reference pressure for the plate 2. Accordingly, the transducer 1 shown in FIG. 1 provides a response which is occasioned by the pressure differential between the evacuated chamber 8 and a pressure applied externally to the other side of the plate or diaphragm 2.

Figure 2:
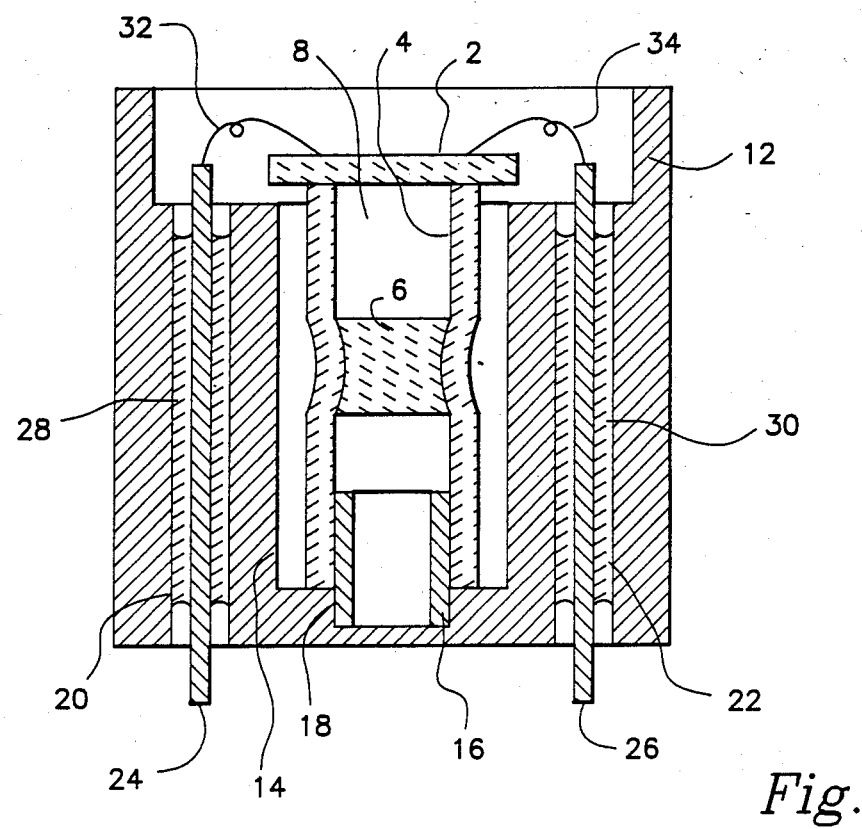
FIG. 2 is a cross-sectional illustration of a support configuration for the transducer shown in FIG. 1.

In FIG. 2, there is shown a mounting or header for supporting the transducer 1 shown in FIG. 1. Similar reference numbers have been used in FIG. 2 to indicate elements common to the illustration of FIG. 1. The header shown in FIG. 2 includes an outer metallic shell 12 having an inner axial chamber 14 for accommodating the transducer 1 shown in FIG. 1. An open end of the tube 4 opposite to the plate 2 is held within the chamber 14 by a Rollpin 16 extending between the tube 4 and a counter bore 18 within the shell 12 at the bottom of the well 14. A pair of through holes 20 and 22 are provided through the shell 12 on respective sides of the well 14. A pair of metallic electrically conductive pins 24,26 are located in respective ones of the holes 20,22. The pins 24,26 are provided with a fluid-tight seal to the internal wall of the holes 20,22 by respective glass seals 28,30 extending therebetween. The pins 24,26 provide electrical connections through the shell 12. Electrical wires 32,34 are connected between the ends of the pins 24,26 adjacent to the plate 2 to provide electrical connections to the strain-sensitive elements diffused in the plate 2.

In FIG. 3, there is shown a pressure transmitter utilizing the header and transducer assembly shown in FIG. 2. Here again, similar reference numbers have been used to indicate structural elements common to FIGS. 1 and 2. The pressure transmitter shown in FIG. 3 includes a pair of coaxial housings 40,42 which are attached together by any suitable means (not shown). A first one of the housings 40 includes a cavity 44 arranged to accommodate the header 12 therein. The outer peripheral surface of the header 12 is attached to the inner wall of the cavity 44 by any suitable means to provide a fluid-tight seal, e.g., epoxy bonding, welding, etc. The header 12 is arranged to expose the outer surface of the plate 2 to the remaining interior volume of the cavity 44. A fluid passage or duct 46 is provided within the housing 40 and extends from the bottom of the cavity 44 to the surface of a concave depression 48 located in a surface of a housing 40.

The second housing 42 is provided with a threaded hole 50 for accommodating a threaded connection to a fluid inlet pipe (not shown). An internal fluid passage 52 is provided between the threaded hole 50 and a concave surface on a surface of the second housing 42. The first and second concave surfaces 48,54 are arranged in a facing coaxial relationship and are separated by a flexible diaphragm 56. The diaphragm 56 and the first surface 48 define a first fluid volume 58, and the diaphragm 56 and the second surface 54 define a second fluid volume 60.

The flexible diaphragm 56 is provided with a fluid-tight seal between its outer peripheral edge and the housing 40,42 by any suitable means, e.g., O-ring 62. A first fill fluid is provided within the first housing 40 and provides a fluid path from one side of the diaphragm 56 through the first volume 58 and the fluid channel 46 to the cavity 44 and the outer surface of the plate 2. An external fluid for applying a pressure to be sensed to the transmitter shown in FIG. 3 is used to fill the fluid volume defined by the threaded bore 50, the fluid channel 52 and the second volume 60 to the other side of the barrier diaphragm 56. Thus, an external pressure applied via the external fluid is effective to act on the barrier diaphragm 56 to transmit a similar pressure through the fill fluid within the first housing 40 to the plate 2 to produce an output signal from the strain-sensitive elements diffused in the plate 2. An output signal from the plate 2 is derived via the wires 32,34, the pins 24,26 and external electrical connections 64,66 attached thereto.

In FIG. 4, there is shown a pictorial illustration of an apparatus for manufacturing the transducer shown in FIG. 1. In this apparatus, it may seen that the tube 4 with the assembled plate 2 is connected to a vacuum source 70, e.g., a vacuum pump, after the plug 6 has been loosely inserted within the tube 4. A pair of tube holders 72,74 are used to hold the tube 4 and to provide a heat sink to protect the integrity of the plate 2. The open end of the tube 4 is sealed to one end of a hollow plunger 76 by an O-ring 78. The other end of the plunger 76 is connected by a pipe 80 to the vacuum source 70. A hollow carbon rod 82 rests on the end of the plunger 76 adjacent to the O-ring 78 and extends into the tube 4 to provide a locating support for the glass plug 6. A gas jet 84 is used to heat the plug 6 and the tube 4 in the vicinity of the plug 6 to produce the constricted surface 10 of the tube 4 to trap the plug 6 and fuse the tube 4 therewith. After cooling, the tube assembly forming the transducer 1 is removed from the clamps 72,74 and utilized as described above.

Accordingly, it may be seen, that there has been provided, in accordance with the present invention, an improved absolute pressure transducer and a method for making the same.

The embodiments of the present invention in which an exclusive property or privilege is claimed are defined as follows:

1. A method for making an absolute pressure transducer including the steps of mounting a strain-sensitive plate on one end of a hollow tube to form a fluid-tight seal therewith, inserting a loose plug within the bore of the tube to define a chamber exposed to the plate, exposing the interior of the tube to a vacuum, concurrently heating the plug and the tube in the vicinity of the plug to allow the heated tube section to fuse with the plug to form a fluid-tight seal to trap the vacuum in the chamber.

2. A method as set forth in claim 1 and including the further step of supporting the plug in the tube at a predetermined location during the heating operation.

3. A method as set forth in claim 2 and including the further step of allowing the fused tube and plug to cool to a working temperature of the transducer.

4. A pressure transducer comprising
   a hollow tube,
   a plate having a first surface and a second surface and supporting strain-sensitive elements on said first surface and having dimensions of said second surface larger than the inner diameter of said tube,
   means for mounting said plate across an end of said tube to form a first fluid-tight seal therewith with said second surface facing an interior of said tube and
   a pressure blocking plug within said tube peripherally attached to an interior wall of said tube to form a second fluid-tight seal across a bore of said tube and defining a chamber between said plug and second surface of said plate wherein said chamber contains a vacuum as a reference pressure.

5. A transducer as set forth in claim 4 wherein said plate is of a semiconductive material and said elements are piezoresistive elements diffused in said plate.

6. A transducer as set forth in claim 4 wherein said plug and said tube are made of glass whereby said plug and said tube are fused to form said second fluid-tight seal.

7. A pressure transducer as set forth in claim 4 wherein said plug and said tube are fused to form said second fluid-tight seal.

8. A pressure transducer as set forth in claim 4 wherein said chamber contains a reference pressure.

9. A pressure transmitter comprising
   a transducer having a hollow tube,
   a plate having a first surface and a second surface and supporting strain-sensitive elements on said first surface and said second surface having dimensions larger than the inner diameter of said tube,
   means for mounting said plate across an end of said tube to form a first fluid-tight seal therewith with said second surface facing an interior of said tube and
   a pressure resistant plug within said tube peripherally attached to an interior wall of said tube to form a second fluid-tight seal across a bore of said tube and defining a chamber between said plug and said second surface of said plate and
   a fluid filled means for applying a pressure to the said first surface wherein said chamber contains a reference pressure applied to one side of said plate, wherein said reference pressure is a vacuum.

10. A pressure transmitter as set forth in claim 9 wherein said fluid filled means includes a fluid filled housing containing said transducer with said other side of said plate exposed to the fluid in said housing, an inlet to said housing and a barrier diaphragm separating said inlet from the fluid in said housing.

11. A pressure transmitter as set forth in claim 10 wherein said tube and said plug are fused to form said second fluid-tight seal.

12. A pressure transmitter as set forth in claim 11 wherein said tube and said plug are made of glass.

13. A pressure transducer comprising
a hollow tube,
a plate supporting strain-sensitive elements and having a first surface and a second surface with dimensions of said second surface larger than an inner diameter of said tube,
means for mounting said plate with said second surface across an end of said tube to form a first fluid-tight seal therewith with said second surface facing an interior of said tube and
a pressure blocking plug within said tube peripherally attached to an interior wall of said tube to form a second fluid-tight seal across a bore of said tube and defining a chamber between said plug and said second surface of said plate wherein said chamber contains a reference chamber, and wherein said reference pressure is a vacuum.

14. A transducer as set forth in claim 13 wherein said tube and said plug are fused to form said second fluid-tight seal.

15. A transducer as set forth in claim 14 wherein said tube and said plug are made of glass.

* * * * *